UNITED STATES PATENT OFFICE.

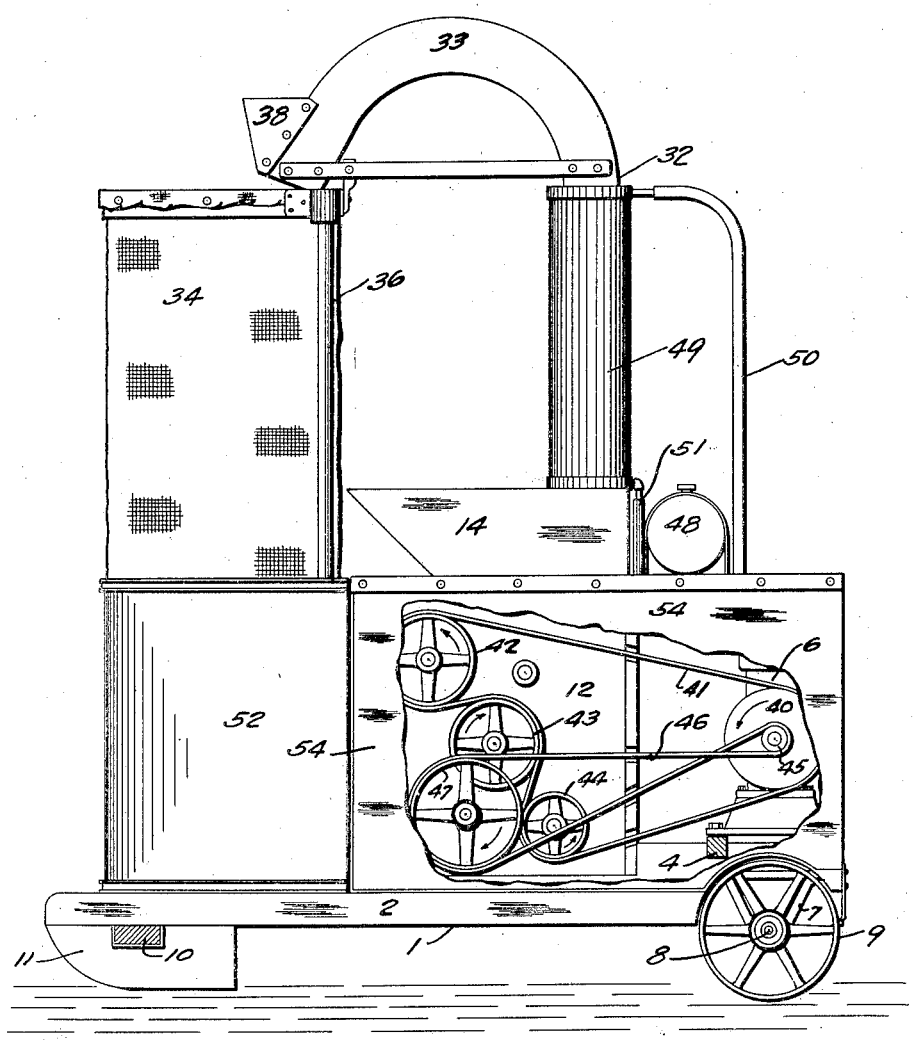

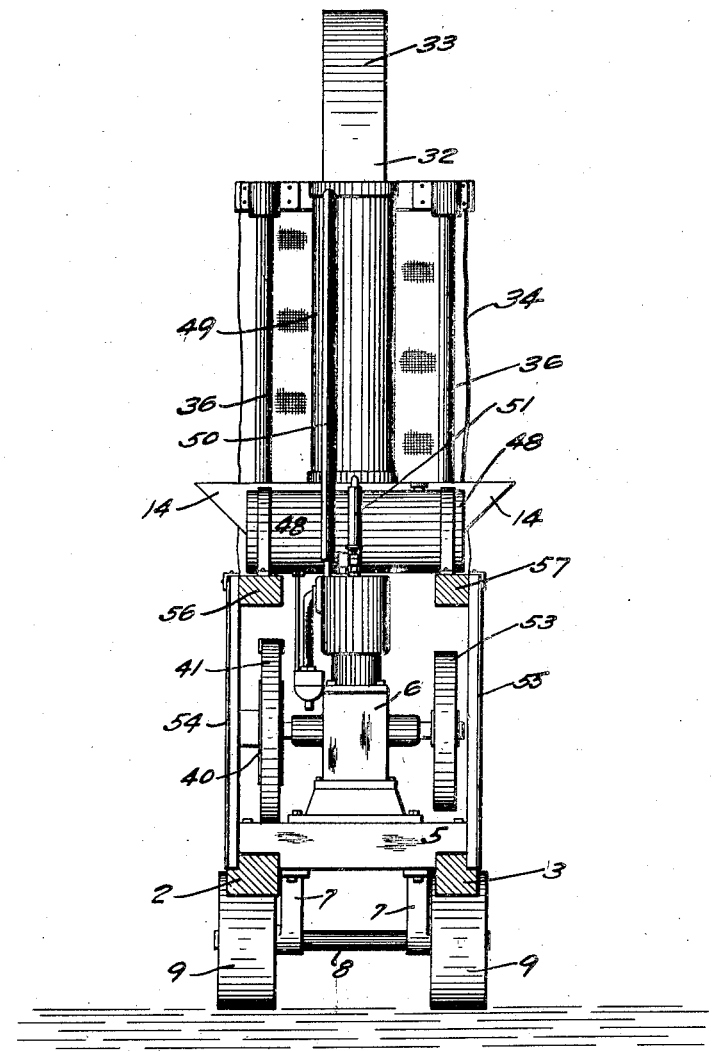

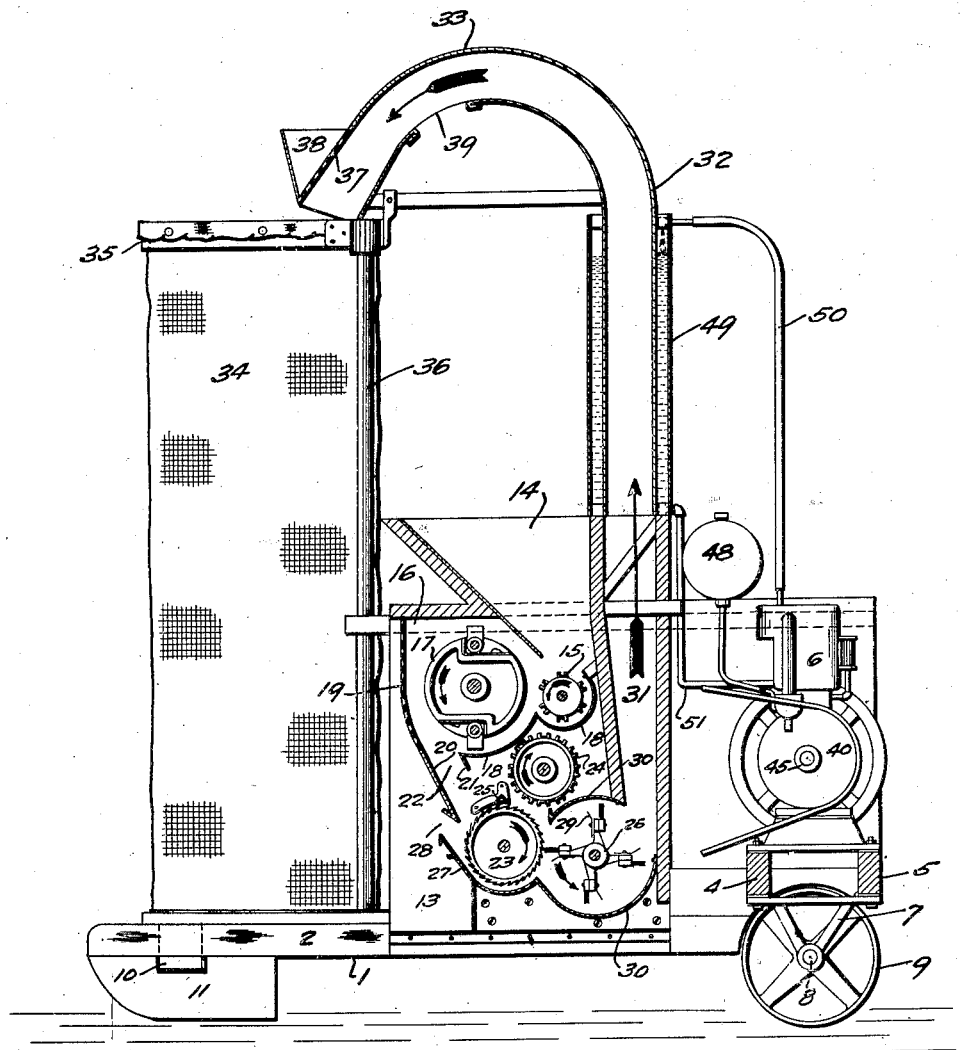

JOHN E. MITCHELL, OF ST. LOUIS, MISSOURI.

PORTABLE COTTON HARVESTING AND SEPARATING MACHINE.

1,357,579. Specification of Letters Patent. Patented Nov. 2, 1920.

Application filed February 27, 1919. Serial No. 279,521.

*To all whom it may concern:*

Be it known that I, JOHN E. MITCHELL, a citizen of the United States, residing in the city of St. Louis and State of Missouri, have invented new and useful Improvements in Portable Cotton Harvesting and Separating Machines, of which the following is a specification.

This invention relates to a portable cotton harvesting and separating machine of the general type illustrated in my prior application for patent, Serial No. 230,977, filed April 26, 1918, wherein a machine is disclosed in the use of which the bolls snapped from the cotton plants may be thrown into a hopper and delivered to suitable mechanism by which the cotton is separated from the hulls and trash and delivered into bags, or other receptacles, carried by the machine, the latter being designed to be advanced across the field between the rows of cotton plants by horse power, or in any other desired manner.

The prior art discloses the fact that machines for gathering and harvesting cotton have been proposed, but so far as my information, based upon an extensive practical knowledge of this industry, serves, no successful commercial machine of this character has ever been manufactured. As a means of explaining more clearly the purposes to be accomplished and the objections to be overcome, by the present machine, I think it desirable to point out the disadvantages which would have followed the operation of any of the machines heretofore proposed, and which probably account for the fact that none of them has ever gone into use, and some of which were discovered in the practical use of my prior machine.

The first objectionable feature noted is that of too great width of machine. These proposed machines are designed, in operation, to straddle one row of cotton plants and have the wheels travel in the adjacent spaces between rows on either side of said row. These wheels thus occupy space which should be left free for the movement of the pickers, and the construction necessarily requires that the machine should be of a height to pass over, without engaging, the tops of the plants, which in turn renders it necessary to place the operating mechanism so high that carriers or conveyers of one kind or another have to be employed for elevating the gathered cotton; with the result that the machine is rendered complicated and costly in construction, and inefficient in operation. Furthermore, the difficulties inherent in the mechanical transportation of cotton, which are well understood by those skilled in the art, would of themselves render the use of such machines impracticable.

Another objection applies to machines of this character which are designed to mechanically gather the cotton and convey it to the cleaning or separating mechanism. Not only has the mechanical gathering or harvesting of cotton proved wholly impracticable in the past, but such machines, in addition, would be of such great size and weight, and so costly, as to render their economical employment by the planter impossible, even if no other objections to their use existed.

A general objection, applicable to practically all of the proposed combined cotton harvesting and cleaning machines that I have observed, is that their weight, height and width combined with an improper disposition of the operating mechanism thereon would render it impossible to operate such machines either economically or successfully for any length of time, for reasons heretofore discussed, and for the additional reason that these combined factors render it practically impossible to prevent excessive vibration of the machine in operation, which is fatal both to efficient operation and the life of the machine.

The machine shown in my prior application itself illustrates several of the disadvantages above set forth, in that it is of too great width and height for effective use, and the operating machinery is so disposed on and supported by the frame of the machine that vibrations of such great intensity occur in operation as to soon render the machinery inoperative as well as to make it wholly impracticable to employ an animal for transporting it. In addition, my prior machine presents an objection which I deal with separately because, so far as I am aware, no similar construction of machine is illustrated in the prior art. This objection resides in the location of a hopper, for receiving the cotton and bolls when gathered, at the rear of the machine. In such location of the hopper, it was found, in operation, that the cotton pickers or boll gatherers were confined in their movement to a limited area behind the machine, and not only interfered with each other in their movements, but the operation of gathering the cotton or bolls was thereby very much retarded, as the operators could only work a short distance behind the machine, in order that the cotton and bolls removed from the plants might readily be thrown into the hopper; and thus only a small section of cotton plants could be picked at one time, no matter how many pickers were employed.

While the above category of objections is not intended to be exhaustive, I have catalogued those, the existence of any one of which would be fatal, in my opinion, to the successful operation of a combined cotton harvesting and separating machine.

The above and various other objections are overcome in the machine of the present invention which is characterized, first, by narrowness of structure; the width of the machine being such as will enable it to be drawn in the space between two adjacent rows of cotton plants, so that the adjacent spaces between two rows of plants on either side of the machine can be occupied by the pickers who, in each location of the machine, operate, respectively, from positions in advance of and to the rear of the machine, on either side thereof; second, by a hopper located substantially centrally of the length of the machine and accessible from either side thereof, so that the cotton pickers have uninterupted access to the hopper on either side of the machine for approaching the same from positions in front of or behind the machine. Such facility of access is impossible where the hopper is located at the rear of the machine, as above pointed out; third, by a platform supported relatively close to the ground, so that the separating machinery may be located directly beneath the receiving hopper without thereby causing the mouth of the latter to be positioned in a plane higher than that of convenient reach to the pickers, so that the major portion of the weight of said machinery, and of the engine for driving it will be supported so close to the ground that there will be no danger of the machine having a tendency to turn over, notwithstanding its narrow construction; and, finally, so that such low mounting of the machine as a whole will reduce to the minimum the vibration incident to the operation of the separating mechanism. The arrangement just described involves, in the embodiment shown in the drawing, the use of relatively small wheels for supporting the machine at the rear, and of relatively low runners, or skids, for supporting the machine at the front, so that the field, or area of vibration incident to the use of a machine employing relatively large wheels, and extending to a considerable height above the ground, is greatly reduced. In fact, in practical operation, I have, by the present machine, entirely eliminated vibration as an objectional feature.

I have found, however, that neither wheels nor skids are essential to the transportation of the machine, and where the ground is soft or moist, the machine can be drawn over the ground more easily without said wheels and skids than with them.

Involved in the general construction of the machine above referred to as an important and practically controlling feature, is the length and relative location of the saw cylinder of the separating mechanism. This saw cylinder is of a length to extend between two rows of plants, such distance being usually about thirty inches, and is located well below the normal height of the tops of the cotton plants, and beneath the boll breaking chamber, which in turn is located directly beneath the receiving hopper. By this arrangement the bolls and cotton thrown into the hopper fall by gravity into the boll breaking chamber, and from the boll breaking chamber to the saw cylinder, thus dispensing with the use of carriers or elevators for transporting the product through the machine. Such a disposition of the parts not only adds to the simplicity of the construction of the machine but in practice we have found that, in principle, it is practically essential to the successful operation of the machine.

While the above constitute the important features of the invention, other features are involved therein, which will be better understood from, and will, therefore, be indicated in, the course of the detailed description of the invention to follow.

In the accompanying drawings;

Figure 1 is a view in side elevation of my improved machine, a portion of a guard or casing being broken away to illustrate the driving connections for the operating mechanism;

Fig. 2 is a view in rear elevation of the same; and Fig. 3 is substantially a vertical longitudinal sectional view showing more particularly the cotton separating mechanism.

Referring now to the drawings, the numeral 1 indicates a platform which comprises, essentially, two parallel side bars 2, 3, which at their rear ends are connected by two transverse frame members 4, 5, which provide a support for a gasolene engine 6. Secured on the under side of the frame members 4, 5 and depending therefrom at either end thereof are brackets 7 which at their lower ends afford bearings for a shaft 8 on the outer ends of which are mounted wheels 9. At their forward ends the bars 2 and 3 are connected by a cross-beam 10 and secured on the underside of each of these bars at said forward end is a runner, or skid, 11. Mounted on the platform 1 is a housing inclosing the separating mechanism, said housing having side walls 12 and 13, Figs. 1 and 3, affording bearings for the shafts of the various rotatable members of said mechanism. This mechanism comprises a hopper 14, the lower open end of which is located immediately above a feed roll 15, which operates to control the supply of the bolls and picked cotton to the boll breaking chamber 16 in which is mounted a boll breaking cylinder 17. The lower sides of the feed roll 15 and breaking cylinder 17 are surrounded at a distance by a guard 18 of sheet metal which separates the boll feeding and breaking mechanism from the cotton separating mechanism. The forward side of the boll breaking chamber is in the form of a foraminous wall 19, which permits a certain amount of dust and trash to be separated from the product, as the bolls are broken up by the action of the boll breaking cylinder 18; and below said boll breaking cylinder the wall 19 is continued downward to form a hull board 20, which, of course, is imperforate. This hull board, in conjunction with a downwardly projecting portion 21 at the end of the guard 18, forms a throat or passage 22 through which the mixed cotton and hulls pass from the boll breaking chamber to a saw cylinder 23. Coöperating with the saw cylinder is a kicker roll 24 which acts, in the well-known manner, to knock back pieces of hull carried up by the saw cylinder with the cotton. Mounted above the saw cylinder is a bar 25 for breaking up, in connection with the saw cylinder, any unbroken bolls that may not have been broken up in the boll breaking chamber. The numeral 26 indicates a doffer roll for removing cotton from the saw cylinder 23. The saw cylinder 23 is partly inclosed on its under side by a sheet metal member 27 which extends upwardly and outwardly from the saw cylinder and with the lower end portion of the hull board 20 forms a passage 28 through which hull particles are knocked by the saw cylinder. The doffer roll 26 is also provided with blades 29 so that it acts as a fan and is partly surrounded by sheet metal members 30 forming a fan-casing. Leading up through the casing inclosing the mechanism just described, and communicating at its lower end with the fan-casing, is a wind trunk 31, and mounted on the top of said casing is an air spout 32 which forms a continuation of the wind trunk 31 and is provided with a forwardly curved portion 33 the open end of which is located over the mouth of a bag 34 adapted to be secured on a ring or similar device 35 mounted on the upper end of a rod 36 secured on the platform 1. On its outer side, at the discharge end, the curved portion 33 of the spout 32 is provided with a series of openings 37 surrounded by a guard 38, and on the under side of the curved portion with an opening 39, the purpose of which construction is to relieve the pressure of air toward the discharge end of the spout and prevent cotton from being blown out of the bag 34. The crank shaft of the engine 6 is provided with a driving pulley 40, Figs. 1 and 3, over which passes a belt 41 which operates the pulleys 42, 43 and 44 connected, respectively, to the shafts of the cylinder 17, the kicker-roll 24 and the doffer roll 26. The crank shaft of the engine is also provided with a second pulley 45 over which passes a belt 46 which operates the pulley 47 on the shaft of the saw cylinder 23. The feed roller 15 is operated by gears located on the opposite side of the machine to that shown in Fig. 1, and which are not shown in the drawing. The numeral 48, indicates a gasolene tank for supplying gasolene to the engine and the numeral 49 a water reservoir for supplying water to cool the engine, this reservoir being shown as surrounding the air spout 33 so that the air passing up said spout will operate in a measure to cool the water therein. The hot water from the engine passes upward through a pipe 50 and enters the top of the reservoir 49 and the water supplied to the engine passes out through the bottom of the reservoir through a pipe 51. The bag 34, as shown in Figs. 1 and 3, is located at the forward end of the machine, its lower portion being housed in a space formed by a substantially semicircular guard 52, Fig. 1, which is supported on the platform 1 and has its opposite ends secured flush with the sides of the outer casing of the cotton separator. This guard provides a smooth rounded front which is continued into smooth side walls provided by the side portions of said guard and the outer casing of the machine, so that in passing between the rows of cotton the rounded end of the guard will operate to separate the branches of plants projecting from opposite rows into the path of the machine; the smooth surfaces presented by said guard and the sides of the machine permitting the machine to slide past the plants without liability of knocking cotton off of the plants. In other words, the construction obviates any sharp corners for engaging the cotton plants. The pulleys shown in Fig. 1 and the fly wheel 53 of the engine, as well as the gearing on the same side of the machine as said fly-wheel are protected from contact with the plants by means of side casing members 54, 55, Fig. 2, removably secured on the side bars 2, 3 and similar upper side bars 56, 57, which constitute a frame for supporting the hopper 14, a gasolene tank 48, the spout 32 and water reservoir 49.

Referring particularly to Figs. 2 and 3, it will be seen that the hopper 14 is not only located centrally of the length of the machine as a whole, but that it extends laterally, and is accessible, at either side of the machine; and it will further be seen from Fig. 3, that as the bolls are thrown into this hopper they will continuously be passed into the boll-breaking chamber by the feed roller 15 and will thence pass directly from said chamber through the throat 22 to the saw cylinders 23. As the cotton is removed from the saw cylinder by the doffer roll 26, the air blast created by the fan 29 will blow said cotton upward through said trunk 31, and through spout 32, and deliver it into the bag 34. The operation of the cotton separating mechanism need not be more fully described, as it is embodied in prior applications or patents of the present inventor, and is well understood by those skilled in the art.

In operation the machine will be pulled by horse power in the space between two rows of cotton plants. Two pickers will be stationed in front of the machine, and two in the rear thereof at points along the length of the row in the spaces on either side of the machine, the forward pickers working away from the machine, and the pickers at the rear working forward to the machine. When the two forward pickers work too far ahead of the machine, the machine is drawn up to them, and they then work forward away from it again. Likewise as the rear pickers work forward to the machine, it is advanced to a new station and the above operation repeated. As an animal pulls the machine over the ground the adjustment of the weight is such that the skids, to a large extent, will be lifted from the ground and offer little resistance to the passage of the machine. The engine and the cotton separating mechanism being located on a platform supported quite close to the ground, the machine has a low center of gravity and operates, as stated, with little vibration.

While I have referred to this machine as a cotton harvesting machine it will be understood that, as in the case of the machine described in my pending application, the machine is particularly adapted for enabling the cotton to be gathered by a process of snapping the bolls from the plants, as this is a quicker process than that of picking the cotton from the bolls.

In gathering cotton, the planter can not only gather or snap the cotton carried in the open and partly open bolls, but at the last of the season can snap the unopened bolls also, and the machine will reclaim the lower grade cotton from the same. When thrown into the hopper these bolls are rapidly broken open by the boll breaking cylinder and the cotton recovered therefrom by the separating mechanism described. By the use of this machine, therefore; the planter is enabled to gather his cotton much more expeditiously than would otherwise be possible, and in harvesting his cotton he is not required to employ skilled pickers, as operators wholly unskilled will suffice for the purpose of snapping the bolls from the plants.

The manner of locating the receptacle for the cotton also conforms to the general plan of maintaining the weight of the machine close to the ground. Thus the bottom of the receptacle extends to, or may rest upon, the platform, which is the lowest part of the machine. By having this receptacle extend down as low to the ground as possible, I am enabled to employ a receptacle of sufficient length without extending the same too far up in the air.

The advantages of a machine of this general character are fully set forth in my said prior application and need not be here repeated. Suffice it to say that all of these advantages are possessed by the present machine and in addition various objections in the construction of the prior machine, and which could only be ascertained by practical use, have been overcome by the present invention.

I claim:

1. A portable cotton harvesting and separating machine having a platform supported relatively close to the ground and having a width adapting it to pass in the space between two rows of plants, a hopper centrally disposed on said machine and accessible from either side thereof, and cotton separating mechanism mounted on said platform and located below said hopper, and embodying a saw cylinder located below the normal height of the plants, the mouth of said hopper being sufficiently close to the ground to enable the operator to readily throw the bolls and cotton therein.

2. A portable cotton harvesting and separating machine having a hopper disposed substantially centrally of its length and accessible from either side of the machine, boll breaking mechanism, located beneath said hopper, and cotton separating mechanism located beneath said boll breaking mechanism, the mouth of said hopper being sufficiently close to the ground to enable the operators to readily throw the bolls and cotton therein.

3. A portable cotton harvesting and separating machine of a width to pass in the space between two rows of plants, and having a platform supported relatively close to the ground, cotton separating mechanism mounted on said platform, a receptacle for cotton carried by said machine, means for elevating the separated cotton and delivering it into said receptacle, said machine presenting a rounded end portion merging into smooth side walls to permit the machine to pass between and to slide past the plants without knocking cotton therefrom.

4. A portable cotton harvesting and separating machine of a width to pass in the space between two rows of plants, and having a platform supported relatively close to the ground, cotton separating mechanism mounted on said platform, a receptacle for cotton carried by said machine positioned in the space between two rows of plants occupied by the machine and having its lower end extending below the normal height of the plants, a guard surrounding the lower portion of said receptacle and forming a rounded end at the front of the machine, and means for elevating the separated cotton and delivering it into said receptacle.

In testimony whereof I have hereunto set my hand.

JOHN E. MITCHELL.